US009353868B2

(12) United States Patent
Julien et al.

(10) Patent No.: US 9,353,868 B2
(45) Date of Patent: May 31, 2016

(54) SEAL FOR ENERGY RECOVERY WHEELS HAVING SPACED APART LATERAL WALLS (71) Applicant: INNERGY TECH INC., Drummondville (CA)

(72) Inventors: Michel Julien, Drummondville (CA); Gabriel Duff, Drummondville (CA); Dominic Blanchette, Drummondville (CA)

(73) Assignee: Innergy Tech Inc., Drummondville (CA)

( * ) Notice: Subject to any disclaimer, the term of this patent is extended or adjusted under 35 U.S.C. 154(b) by 157 days.

(21) Appl. No.: 13/716,775

(22) Filed: Dec. 17, 2012

(65) Prior Publication Data

US 2013/0161911 A1 Jun. 27, 2013

Related U.S. Application Data (60) Provisional application No. 61/579,091, filed on Dec. 22, 2011.

(51) Int. Cl.
*F16J 15/32* (2006.01)
*F16J 15/44* (2006.01)

(52) U.S. Cl.
CPC .................... *F16J 15/44* (2013.01)

(58) Field of Classification Search
CPC .............................. F16J 15/447; F16J 15/4472
USPC ................................................. 277/412, 421
See application file for complete search history.

(56) References Cited

U.S. PATENT DOCUMENTS

| 4,296,937 | A | * | 10/1981 | Handa | ............................... 165/9 |
| 4,330,028 | A | | 5/1982 | Pujari et al. | |
| 5,145,011 | A | | 9/1992 | Seike et al. | |
| 5,960,625 | A | | 10/1999 | Zdvorak, Sr. | |
| 6,131,910 | A | * | 10/2000 | Bagepalli | ................ F01D 5/225 |
| | | | | | 277/355 |
| 2010/0200068 | A1 | | 8/2010 | D'Arcy et al. | |
| 2015/0001807 | A1 | * | 1/2015 | Cho | ..................... F16J 15/4472 |
| | | | | | 277/349 |

FOREIGN PATENT DOCUMENTS

| CA | 2799982 A1 | 6/2013 |
| KR | 10825081 B1 * | 4/2008 |

OTHER PUBLICATIONS

Canadian Application Serial No. 2,799,982, Office Action mailed Jun. 9, 2014, 2 pgs.

* cited by examiner

*Primary Examiner* — Gilbert Lee
(74) *Attorney, Agent, or Firm* — Schwegman Lundberg & Woessner, P.A.

(57) ABSTRACT

The present relates to a seal for an energy recovery wheel. The seal comprises a main body defining an inner surface, and a pair of lateral walls extending from each lateral side of the main body. Each lateral wall respectively comprises a free edge defining a lip. The inner surface and lateral walls define a space therebetween. The seal provides for air travelling from one section of the energy recovery wheel to another to turbulate within the space. The inner surface is generally flat and the space may comprise a cavity. The lateral walls may be flexible or rigid. The present also relates to a combination of the seal with the energy recovery wheel.

20 Claims, 15 Drawing Sheets

| ESTIMATED FAN OPERATING COST INCREASE PER YEAR (24/24, 7/7) |||||||
|---|---|---|---|---|---|---|
| OACF | CFM INCREASE | NEW YORK (0.24$/kWh) | BOSTON (0.19$/kWh) | MIAMI (0.11$/kWh) | SAN FRANCISCO (0.18$/kWh) | HOUSTON (0.10$/kWh) |
| 1.05 | 500 | 915 $ | 725 $ | 420 $ | 687 $ | 381 $ |
| 1.10 | 1000 | 1,831 $ | 1,449 $ | 839 $ | 1,373 $ | 763 $ |
| 1.20 | 2000 | 3,661 $ | 2,899 $ | 1,678 $ | 2,746 $ | 1,526 $ |
| 1.30 | 3000 | 5,492 $ | 4,348 $ | 2,517 $ | 4,119 $ | 2,288 $ |

SEAL FOR ENERGY RECOVERY WHEELS HAVING SPACED APART LATERAL WALLS

TECHNICAL FIELD

The present disclosure relates to seals used in the recovery wheel industry. More particularly, but not exclusively, the present disclosure relates to a seal for energy recovery wheels having spaced apart lateral walls.

BACKGROUND

Typically, seals used in wheel structures for various industries such as energy recovery, Heating Ventilation and Air-Conditioning (HVAC), energy transfer and the like, fall into two main categories: Rubber 4-Pass labyrinth seals and brush seals. The 4-Pass labyrinth seals are known for their labyrinth effect, but are hard to install. In fact, if installed too close from the wheel, the seal damages the wheel. And if installed too far from the wheel, the leakage level is greatly increased. In contrast, brush seals are easy to install but quick to wear; and lack any kind of labyrinth effect.

There thus remains a need for an improved seal for energy recovery wheels that addresses the drawbacks described above.

SUMMARY

In accordance with an aspect of the present disclosure, there is provided a seal for an energy recovery wheel. The seal comprises a main body defining an inner surface, and a pair of lateral walls extending from each lateral side of the main body. Each lateral wall respectively comprises a free edge defining a lip. And the inner surface and lateral walls define a space therebetween.

In accordance with an aspect of the present disclosure, there is provided a seal in combination with an energy recovery wheel. The seal comprises a main body defining an inner surface, and a pair of lateral walls extending from each lateral side of the main body. Each lateral wall respectively comprises a free edge defining a lip. And the inner surface and lateral walls define a space therebetween.

In an embodiment, the main body is made of rigid material. In an embodiment, the main body is made of flexible material. In an embodiment, the inner surface is generally flat.

In an embodiment, the lateral walls are flexible. In an embodiment, the lateral walls are rigid. In an embodiment, the lips abut the energy recovery wheel when mounted thereto.

In an embodiment, the space comprises a cavity. In an embodiment, the seal provides for air travelling from one section of the energy recovery wheel to another, to turbulate within the space. In an embodiment, the seal provides for decelerating air travelling from one section of the energy recovery wheel to another, the air being caught therein. In an embodiment, the seal provides for air expansion and contraction within the space.

The foregoing and other features of the present disclosure will become more apparent upon reading of the following non-restrictive description of examples of implementation thereof, given by way of illustration only with reference to the accompanying drawings.

BRIEF DESCRIPTION OF THE DRAWINGS

In the appended drawings, where like reference numerals denote like elements throughout and in where.

DETAILED DESCRIPTION

To better understand the present specification, the following definitions are provided.

Energy recovery wheel: the expression "energy recovery wheel" should be interpreted to also include, without limitation thereto, a rotary wheel, a thermal wheel, a sensible wheel, a heat wheel, a desiccant wheel, a dehumidification wheel, a heat and/or moisture recovery wheel, a total energy recovery wheel, a enthalpy wheel, a regeneratable rotary dehumidification wheel, a rotary enthalpy wheel, a rotating wheel exchanger and the like.

Generally stated, there is provided a seal for an energy recovery wheel. The seal comprises a main body defining an inner surface, and a pair of lateral walls which extend from each lateral side of the main body. In one example, the main body is rigid and the lateral walls are flexible. The main body may also be made of a flexible material. The lateral walls may also be rigid. Each of the lateral walls comprises a free edge defining a lip for abutting the energy recovery wheel when mounted thereto. The inner surface and lateral walls define a space therebetween, which provides for air that is travelling from one section of the energy recovery wheel to another, to turbulate therein. The space may comprise a cavity.

The seal also provides for decelerating air travelling from one section of the energy recovery wheel to another, the air being caught therein. And the seal provides for air expansion and contraction within the space.

The aforementioned seal has the following advantages. It includes characteristics from both the typical labyrinth seals and brush seals. It produces a relatively insignificant leakage level by offering an improved labyrinth effect and zero sealto-media installation distance. It is capable of withstanding pressure differentials of up to 10" WC.

With reference to the appended drawings, non-restrictive illustrative embodiments will be described so as to provide examples and not limit the scope of the disclosure.

FIGS. 1-7 show a seal 10 for being mounted to an energy recovery wheel 12.

The seal 10 comprises a main body 14 made of an assembly having a backing 16 with a mounting bracket 18 extending therefrom, which is mounted on a tubular member 20 of the energy recovery wheel frame 22. The main body assembly 14 includes an outer longitudinal flange member 24 mounted to the backing 16 and an inner longitudinal flange member 26 mounted to the outer member 24; and sandwiching therebetween a longitudinal flange gasket 28. The inner longitudinal flange member 26 defines an inner, generally flat, surface 30.

The gasket 28 provides lateral flexible walls 32, which define free edges forming respective lips 34.

The gasket 28 also provides top and bottom walls 36 and 38.

The inner surface 30, the walls 32, 36 and 38 define a space S therebetween, which provides for air turbulence as will be further described herein.

Figure 1:
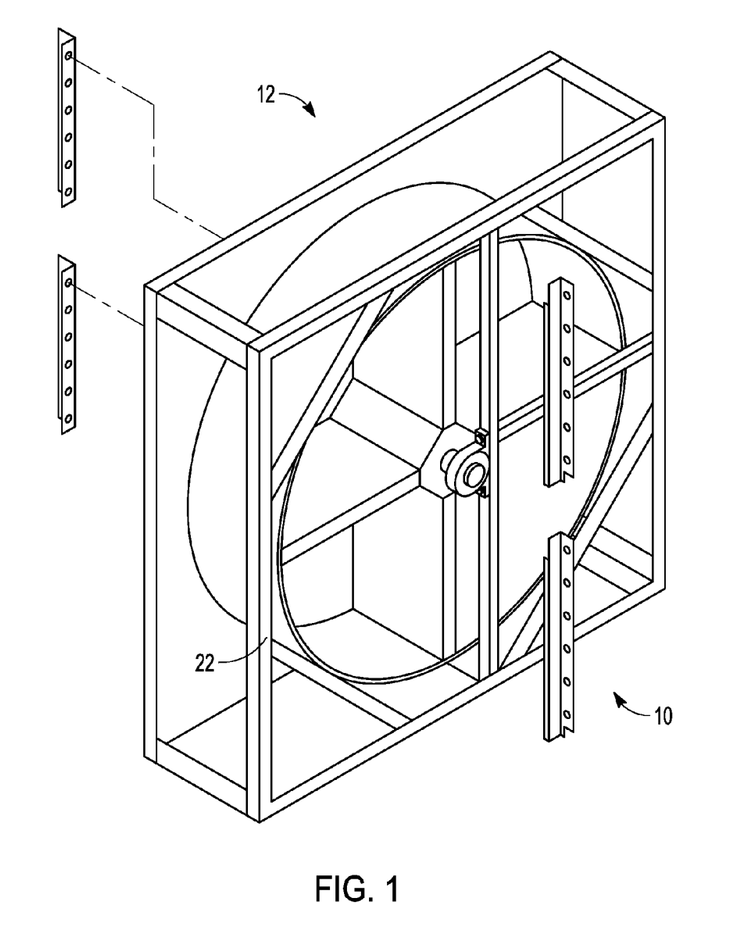
FIG. 1 is a perspective view of an energy recovery wheel in combination with the seal of the present disclosure, in accordance with a non-restrictive illustrative embodiment thereof.
Figure 2:
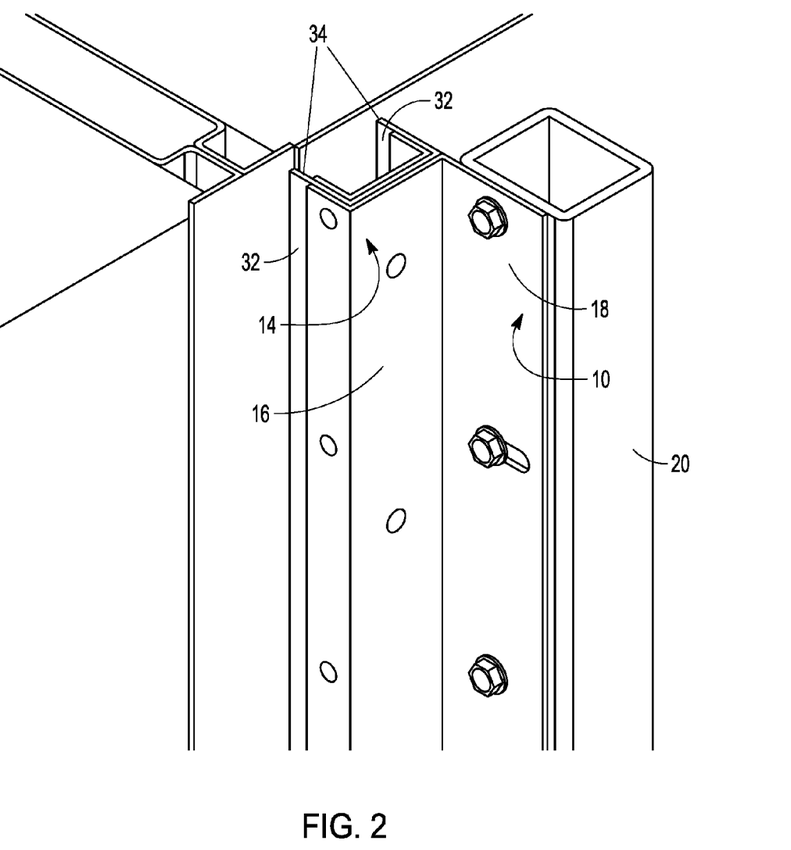
FIG. 2 is a close-up perspective view of FIG. 1.
Figure 3:
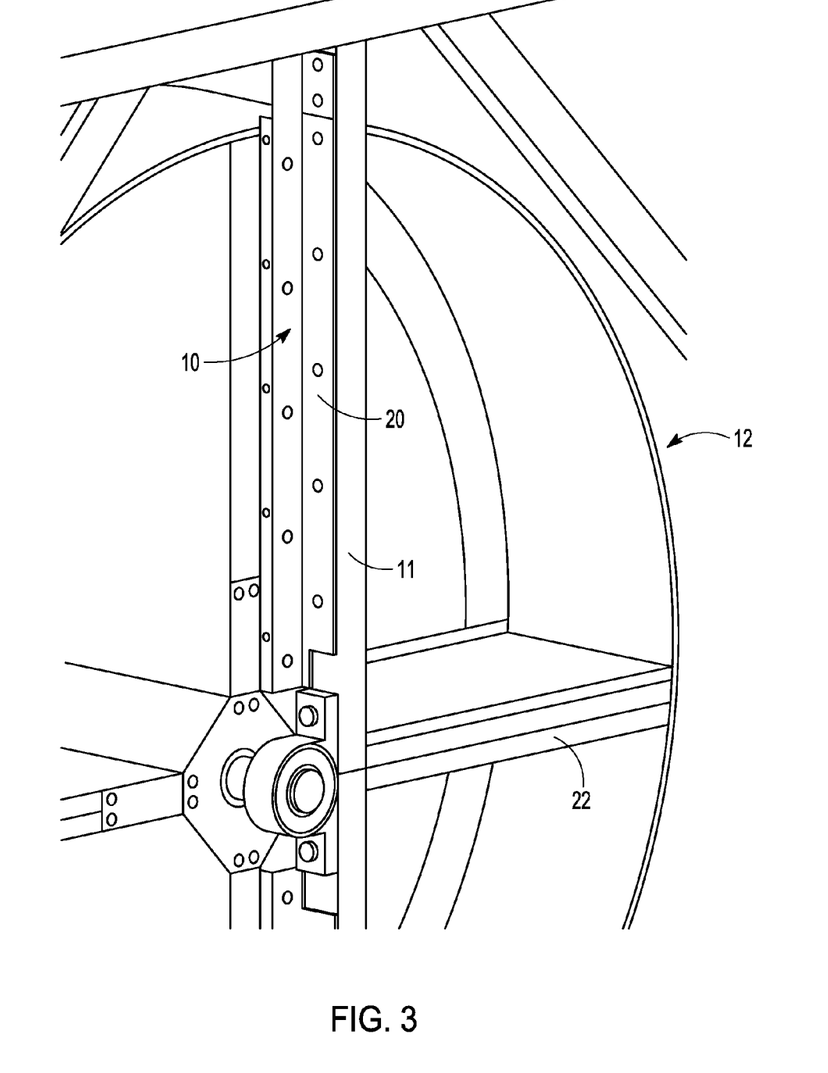
FIG. 3 is another close-up perspective view of FIG. 1.
Figure 4:
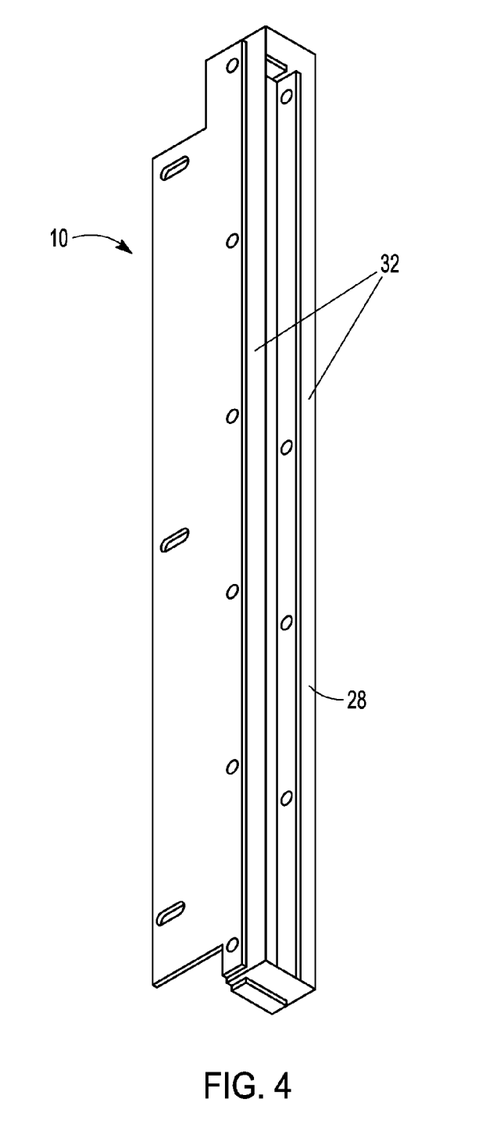
FIG. 4 is a perspective rear view of the seal of the present disclosure, in accordance with a non-restrictive illustrative embodiment thereof.
Figure 5:
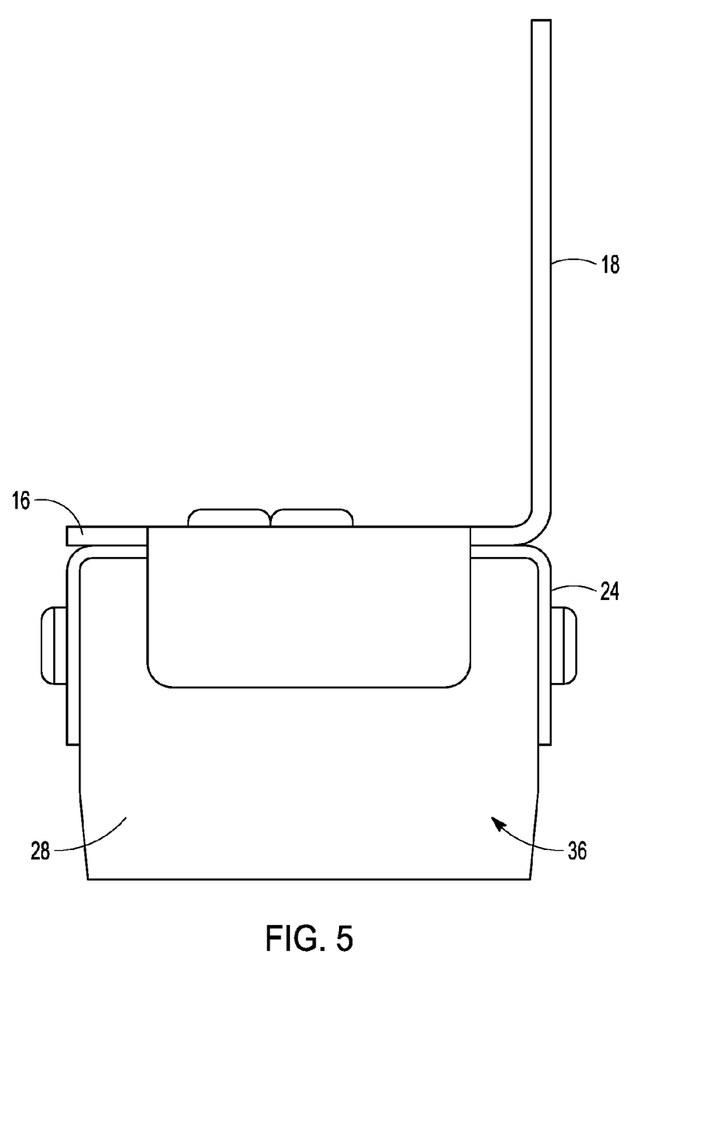
FIG. 5 is a top plan view of the seal of FIG. 4.
Figure 6:
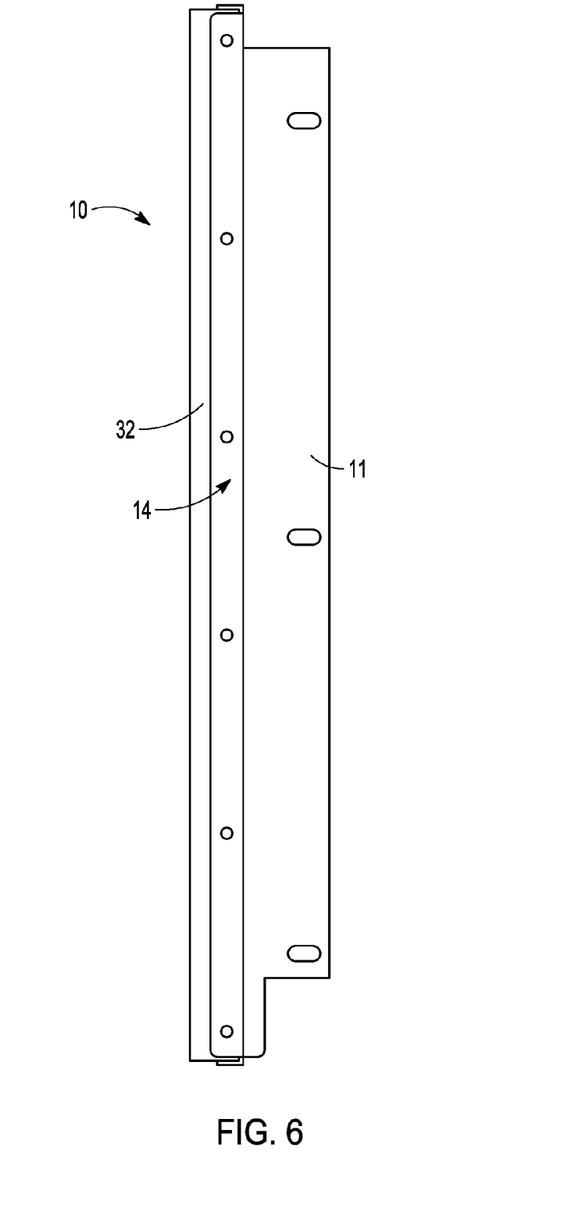
FIG. 6 is a lateral elevation view of the seal of FIG. 4.
Figure 7:
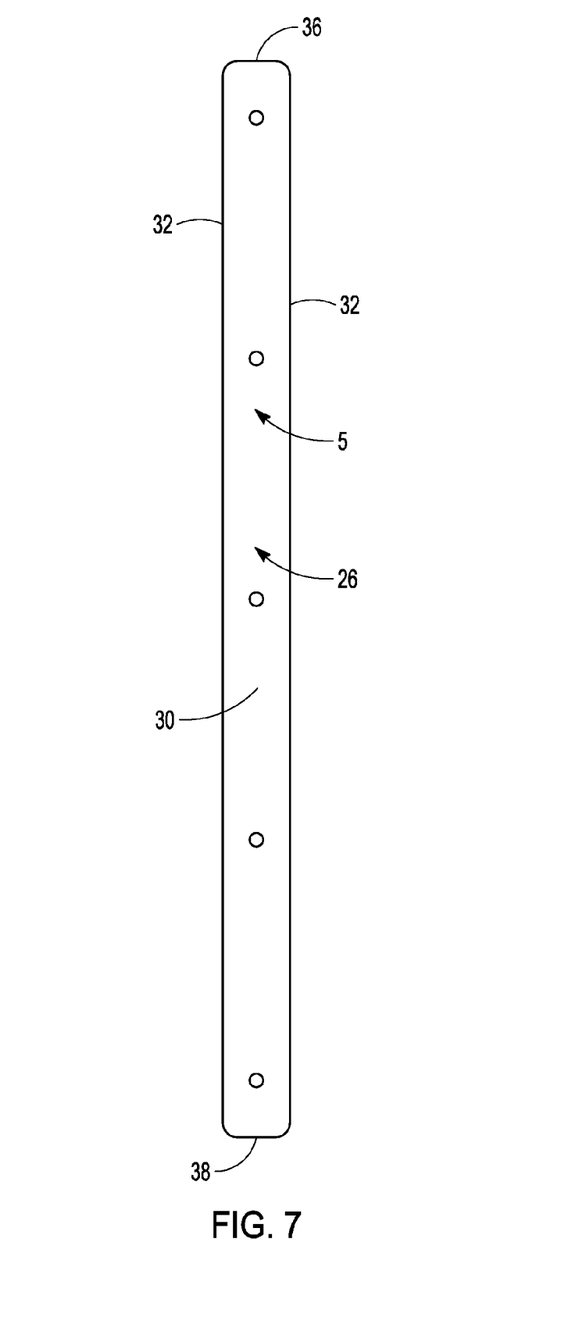
FIG. 7 is a front view of the seal of FIG. 4.
Figure 8:
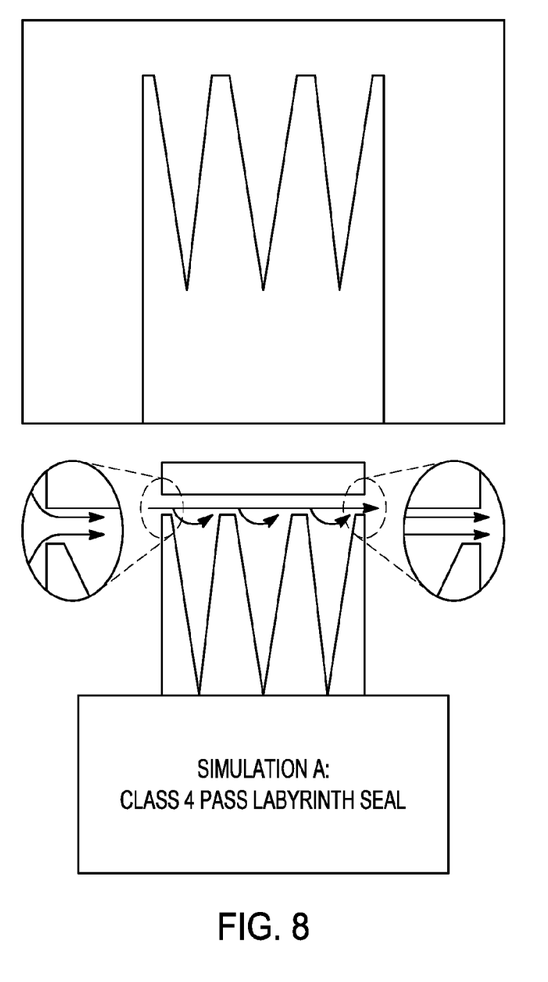
FIG. 8 is a computer simulation of a prior art seal for an energy recovery seal.

FIG. 8 shows a computer simulation showing a prior art labyrinth seal. As shown, the turbulence and contraction effects are not improved by adding more lips or passes therebetween. In fact, the opposite happens since too many lips eliminate most of the desired turbulence needed to produce the entering and leaving edge restrictions. The air remains between the seal and the media, and as such fails to create the desired labyrinth effect. The air velocity through the seal is fairly constant, preventing any of the desired entering and leaving edge restrictions.

Figure 9:
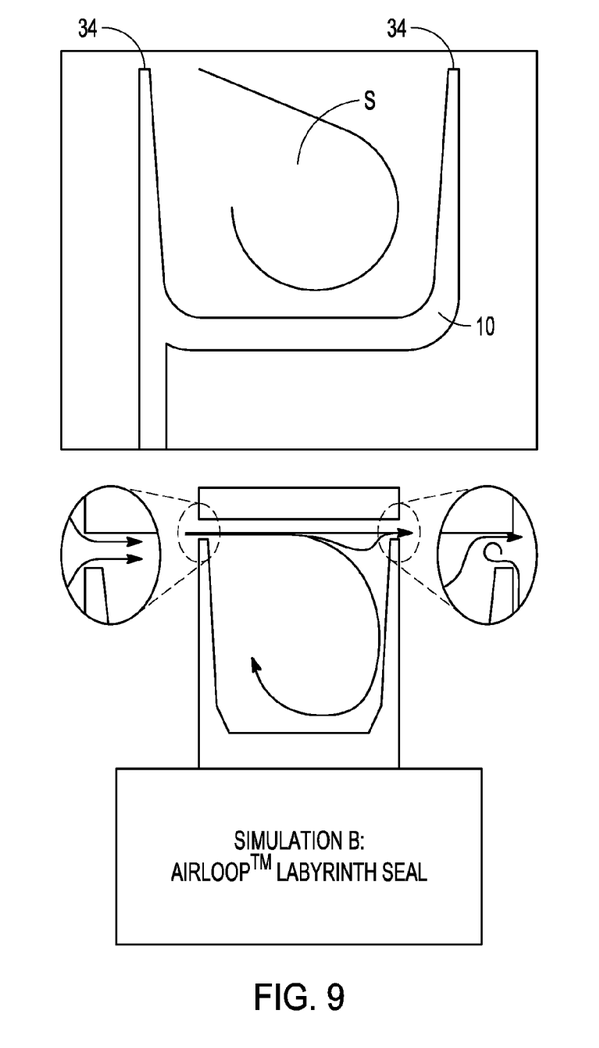
FIG. 9 is a computer simulation of the seal of the present disclosure, in accordance with a non-restrictive illustrative embodiment thereof.

FIG. 9 shows a computer simulation of seal 10 which solves the aforementioned problems and creates a true labyrinth effect, by allowing the air to use the whole depth (space S) of the seal 10. In addition, the air velocity through the seal greatly varies and leads to real edge restrictions.

The lip points 34 of the seal 10 are smaller touching points, which diminish the amount of air that enters and leaves the space S, due to the looping of air within this space (i.e. turbulence) that is caused by the lip points 34.

Figure 10:
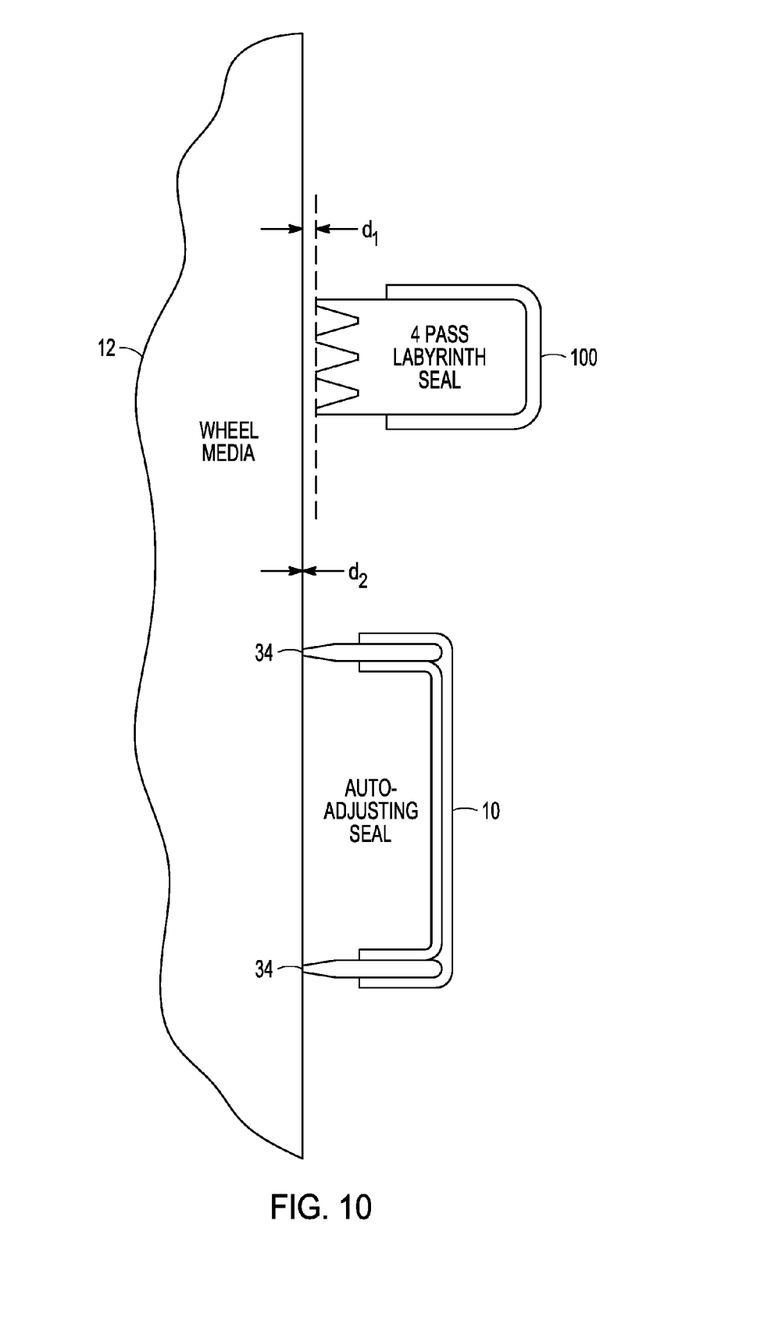
FIG. 10 is a schematic representation comparing the prior art seal and the seal of FIG. 9 mounted to an energy recovery wheel.

A comparison between the prior art seals and the seal 10 of the disclosure is also shown in FIG. 10, further demonstrating that the present seal 10 provides for easy installation with almost zero gap between the seal 10 and the wheel media 12, as compared to the prior art 4-pass labyrinth seal 100.

Another critical aspect directly affecting the overall seal leakage is how close the seal can be installed from the wheel's media. Differences as small as 1/32" will have an impact. So it is preferable that the seal be installed as close as possible to the wheel 12.

With conventional 4 Pass rubber labyrinth seals, any contact between the seal and media will lead to damages. Therefore, on top of the wheel tolerance, a "safety" distance must be added. The result is an installation distance "d1" that goes from 1/16" to 1/8", or even more, depending on the wheel's construction and installer.

The present air-loop seal 10 is made out of a special material, which was specifically chosen to make sure it could never damage the media. As a result, there is no need for any added "safety" distance with this design. The seal 10 can therefore be allowed to touch the wheel 12 with no initial gap. As the wheel 12 turns, the seal 10 automatically adjusts itself to the wheel's tolerance (approximately 1/32") for the smallest possible air leakage.

Figure 11:
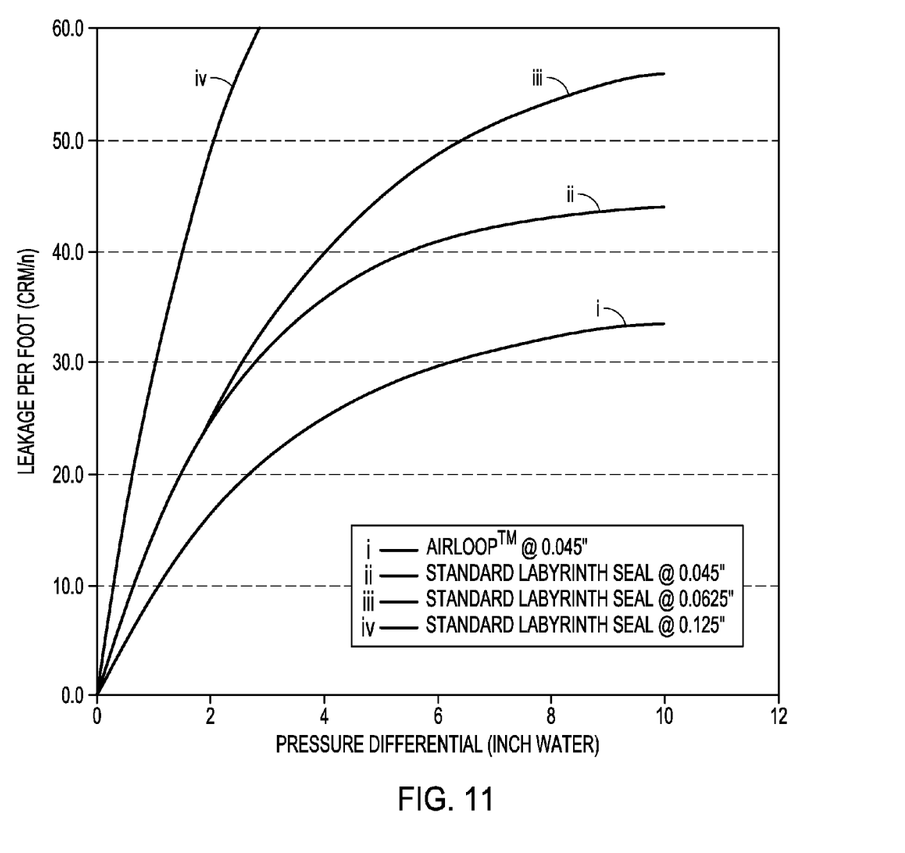
FIG. 11 shows a seal leakage comparison.

Turning to FIG. 11, there is shown a seal leakage comparison (Graph 1), which clearly shows the improvement obtained by using the present air-loop labyrinth seal 10. It should be noted that the tests leading to this graph were made by controlling the pressure differentials on both sides of the seal sections, only to eliminate the variations that could come with different wheel designs. Also, comparing the curves of both types of seal at 0.045" gap clearly shows the superiority of the labyrinth effect created by the present air-loop labyrinth seal 10.

Figure 12:
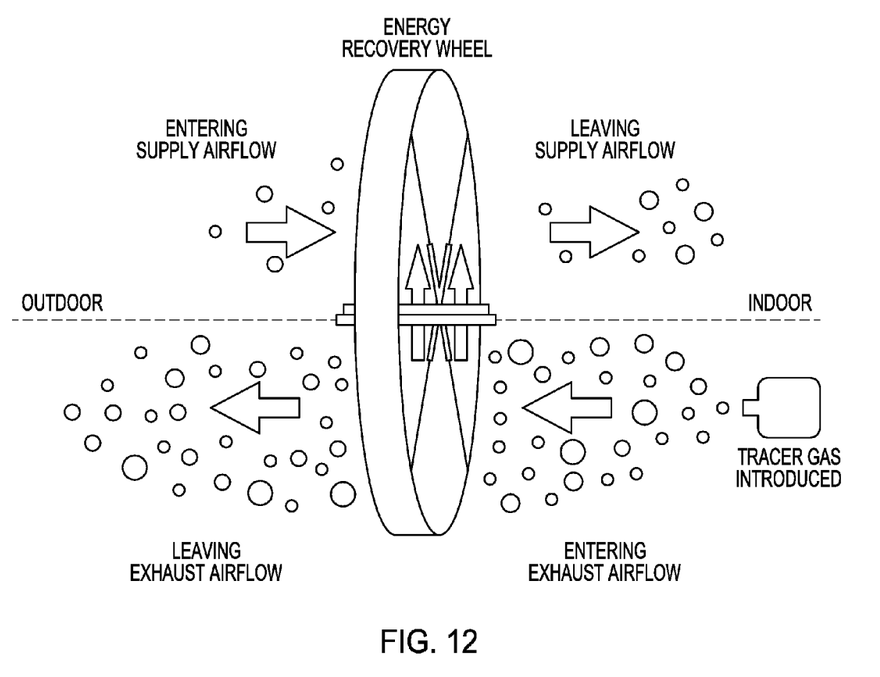
FIG. 12 shows an Exhaust Air Transfer Ratio (EATR) diagram.

The Exhaust Air Transfer Ratio (EATR) is a measure of the wheel contamination level. As shown in the EATR diagram of FIG. 12, it is measured by first introducing a certain tracer gas concentration in the Entering Exhaust Airflow (C3). The EATR result, expressed as a percentage, is calculated by dividing the concentration difference between the Leaving Supply Airflow (C2) and Entering Supply Airflow (C1) by the concentration difference between the Entering Exhaust Airflow (C3) and Entering Supply Airflow (C1).

Figure 13:
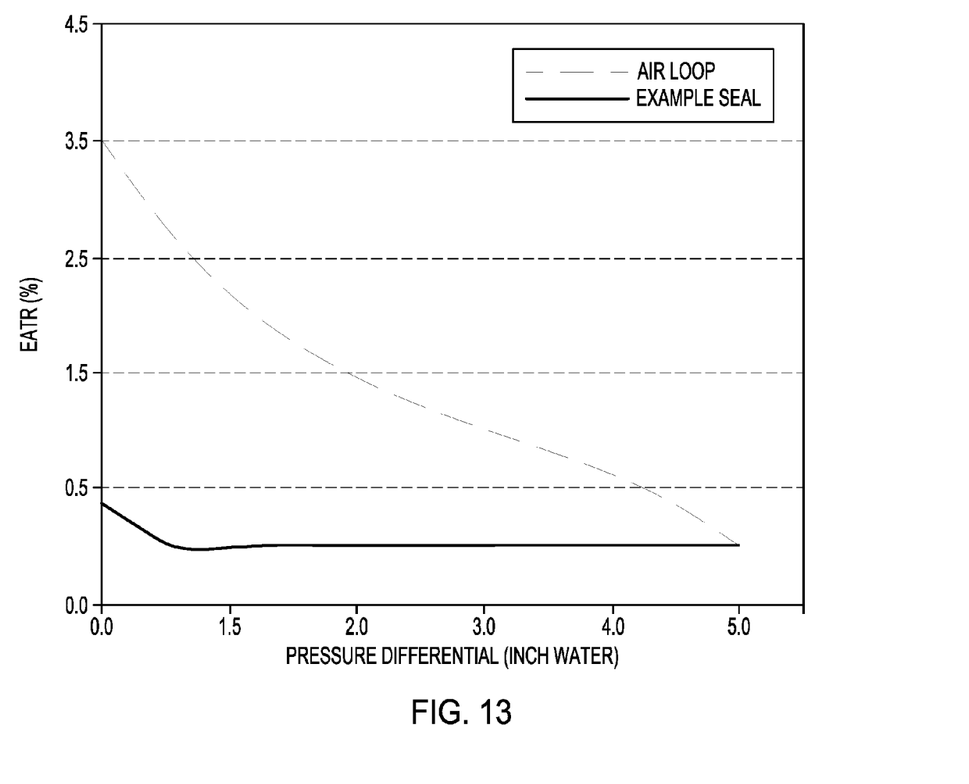
FIG. 13 shows an EATR level of an energy recovery wheel equipped with the seal of the present disclosure, in accordance with a non-restrictive illustrative embodiment thereof.

Factors influencing the EATR levels of a given energy recovery wheel are the seals, the desiccant (to a lesser extent), the pressure differentials; as well as the presence of a correctly adjusted purge section. FIG. 13 (Graph 2) shows the EATR level of an energy recovery wheel 12 equipped with the present air-loop labyrinth seal 10. Important values of note are that an EATR of 0% (no contamination) can be obtained with no purge for a pressure differential of 5" WC, while the same value can be obtained with the use of a purge section starting at pressure differentials as low as 0.5" WC.

The Outdoor Air Correction Factor (OACF) is the ratio of the entering supply airflow on the leaving supply airflow. Directly affecting the fans energy consumption, the OACF is by far the most overlooked aspect of energy recovery wheels.

Figure 14:
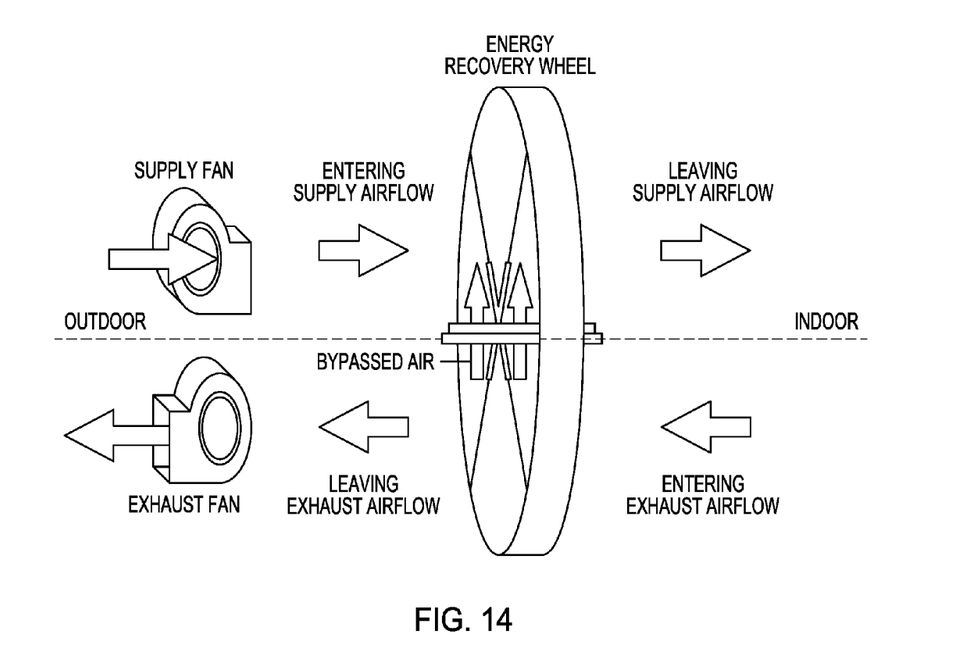
FIG. 14 shows an Outdoor Air Correction Factor (OACF) diagram.

FIG. 14 shows that with high enough pressure differentials, OACF values of 1.5 or more can be obtained with certain wheel designs. In this example, the supply fan will have to deliver a total of 15000 Cubic Feet per Minute (CFM), instead of delivering the required 10000 CFM.

Figure 15:
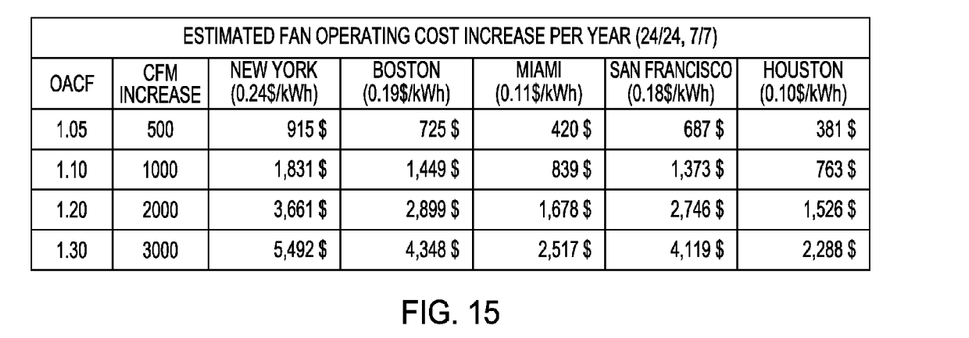
FIG. 15 shows a chart of an OACF's influence on the energy recovery wheel's operating costs.

Based on a similar 10000 CFM unit, an estimated fan operating cost increase can be calculated for different locations and OACF values. As shown in the chart of FIG. 15, the influence of OACF on operating costs is not negligible.

Effectiveness is counterbalanced by pressure drops for a given exchanger size. A higher effectiveness always comes with higher pressure drops. Similarly, lower EATR levels always come at the cost of higher OACF values. One of the challenges of an energy recovery wheel manufacturer is to determine design features that allow for very low EATR levels, while minimizing the OACF increase. The present seal 10 allows to achieve such results.

Figure 16:
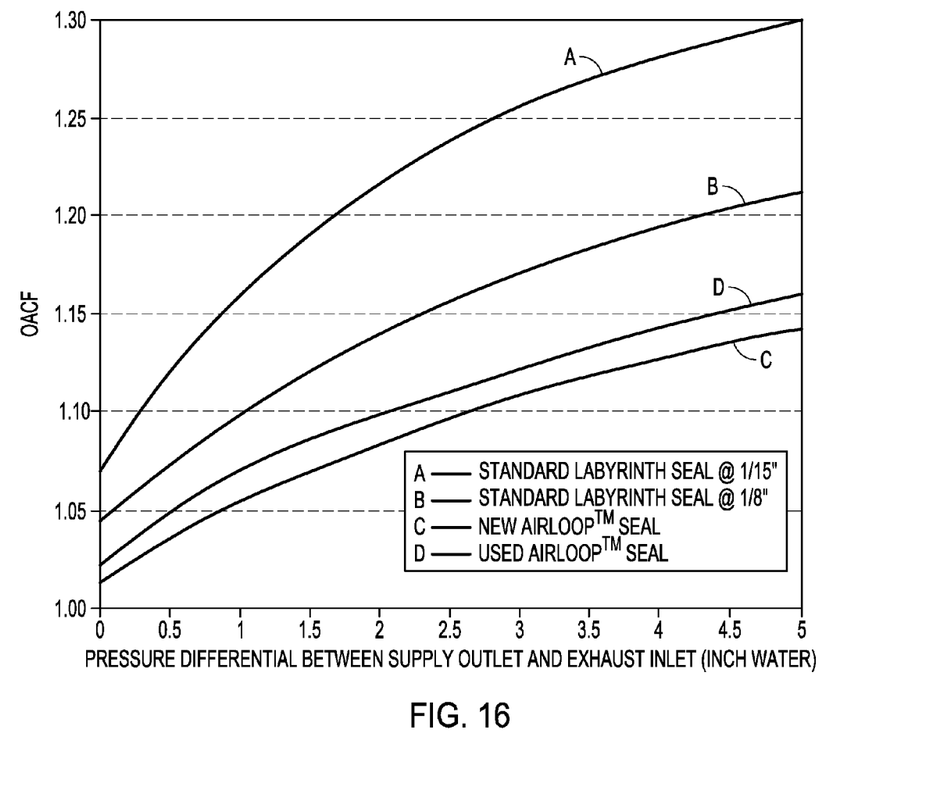
FIG. 16 shows a graph demonstrating the effect of the seal of the present disclosure on an OAFC level of an energy recovery wheel, in accordance with a non-restrictive illustrative embodiment thereof.

The OACF graph shown in FIG. 16 (Graph 3) demonstrates how the seal 10 improves the OACF level of an energy recovery wheel 12. While the improvement is already important at low pressure differentials, it becomes major as pressure differentials increase in the range where most air handling units are operated (2" to 3" WC). At these levels, the difference in the fan operating costs can result in savings that are equal to the full cost of the energy recovery wheel in just a few years.

In an embodiment, the present seal 10 provides for rectifying the EATR and OACF values of an energy recovery wheel 12 for up to 5" pressure differentials within the Air-Conditioning, Heating and Refrigeration Institute (AHRI) 1060 (I-P) standard.

It should be noted that the various components and features described above can be combined in a variety of ways, so as to provide other non-illustrated embodiments within the scope of the disclosure. As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Although the present disclosure has been described in the foregoing description by way of illustrative embodiments thereof, these embodiments can be modified at will, without departing from the spirit, scope and nature of the subject disclosure.

What is claimed is:

1. A seal for an energy recovery wheel including a wheel media, the energy recovery wheel being rotatable to rotate the wheel media about an axis, the seal comprising:
    a main body positioned to extend radially outward from the axis and defining an inner surface; and
    a pair of lateral walls extending from each lateral side of the main body, each lateral wall respectively comprising a free edge defining a lip positioned to engage the wheel media of the energy recovery wheel as the energy recovery wheel rotates about the axis;
    wherein the lateral walls define a space therebetween, the space extending from the lips to the inner surface.

2. A seal according to claim 1, wherein said main body is made of rigid material.

3. A seal according to claim 1, wherein said inner surface is generally flat.

4. A seal according to claim 1, wherein said lateral walls are flexible.

5. A seal according to claim 1, wherein said lateral walls are rigid.

6. A seal according to claim 1, wherein said space comprises a cavity.

7. A seal according to claim 1, wherein said seal provides for air travelling from one section of the energy recovery wheel to another to turbulate within said space.

8. A seal according to claim 1, wherein said seal provides for decelerating air travelling from one section of the energy recovery wheel to another and caught therein.

9. A seal according to claim 1, wherein said seal provides for air expansion and contraction within said space.

10. A seal according to claim 1, wherein said lips abut the energy recovery wheel when mounted thereto.

11. An energy recovery system, the system comprising:
    an energy recovery wheel including a wheel media, the energy recovery wheel being rotatable to rotate the wheel media about an axis; and
    a seal having:
        a main body positioned to extend radially outward from the axis and defining an inner surface; and
        a pair of lateral walls extending from each lateral side of the main body, each lateral wall respectively comprising a free edge defining a lip positioned to engage the wheel media of the energy recovery wheel as the energy recovery wheel rotates about the axis;
        wherein the inner surface and lateral walls define a space therebetween, the space extending from the lips to the inner surface.

12. An energy recovery system according to claim 11, wherein said main body is made of rigid material.

13. An energy recovery system according to claim 11, wherein said inner surface is generally flat.

14. An energy recovery system according to claim 11, wherein said lateral walls are flexible.

15. An energy recovery system according to claim 11, wherein said lateral walls are rigid.

16. An energy recovery system according to claim 11, wherein said space comprises a cavity.

17. An energy recovery system according to claim 11, wherein said seal provides for air travelling from one section of the energy recovery wheel to another to turbulate within said space.

18. An energy recovery system according to claim 11, wherein said seal provides for decelerating air travelling from one section of the energy recovery wheel to another and caught therein.

19. An energy recovery system according to claim 11, wherein said seal provides for air expansion and contraction within said space.

20. An energy recovery system according to claim 11, wherein said lips abut the energy recovery wheel when mounted thereto.

* * * * *